United States Patent Office 2,915,200
Patented Dec. 1, 1959

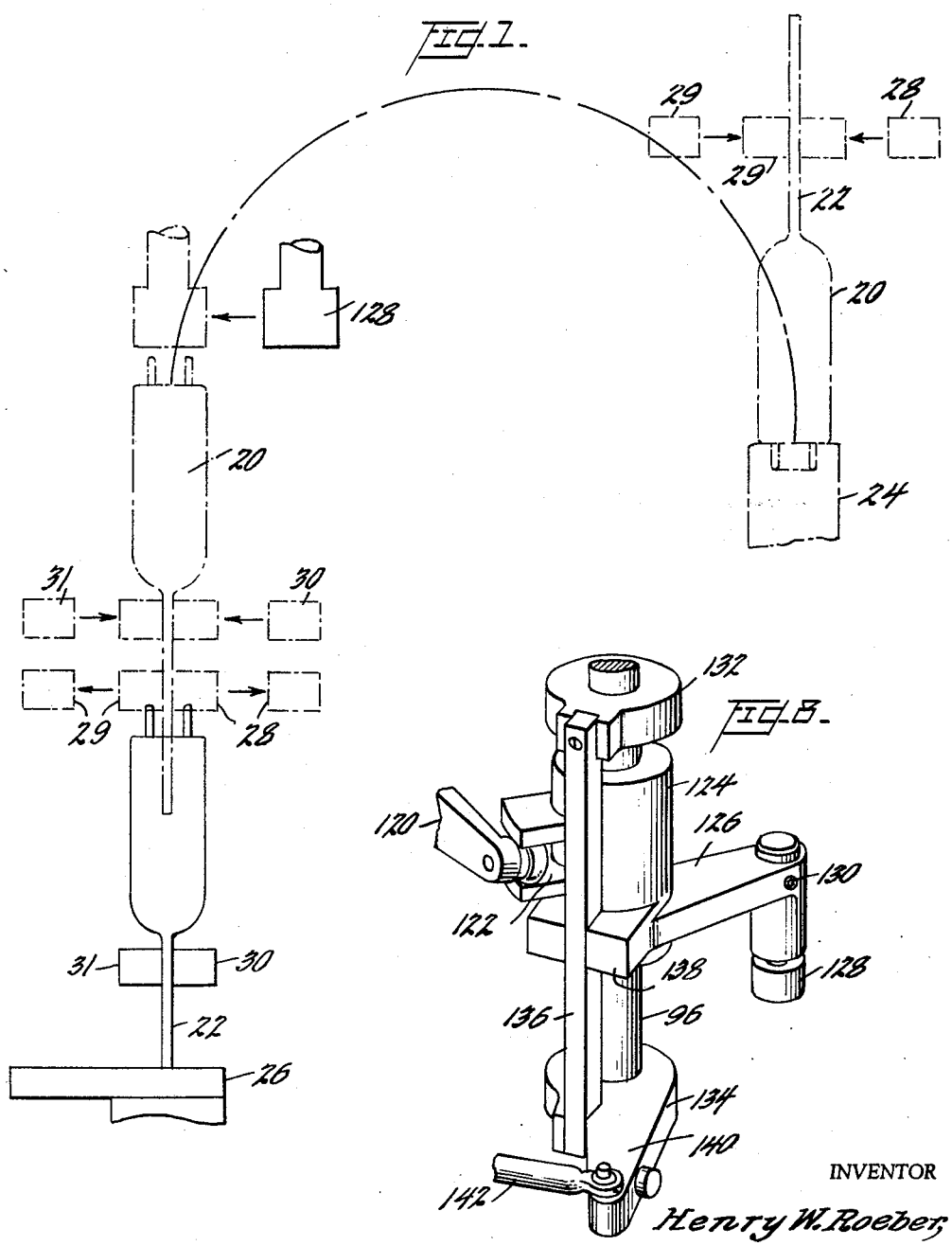

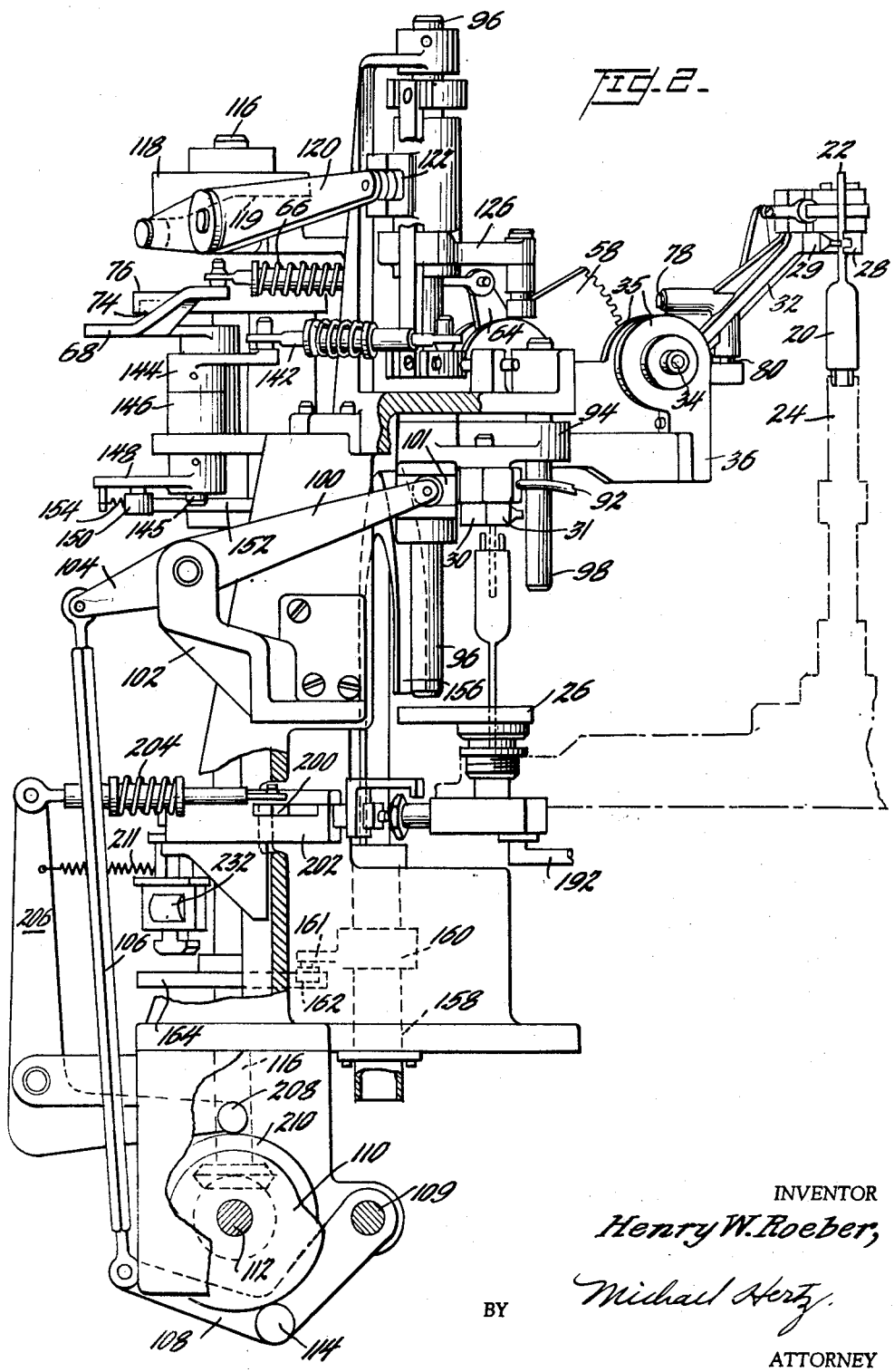

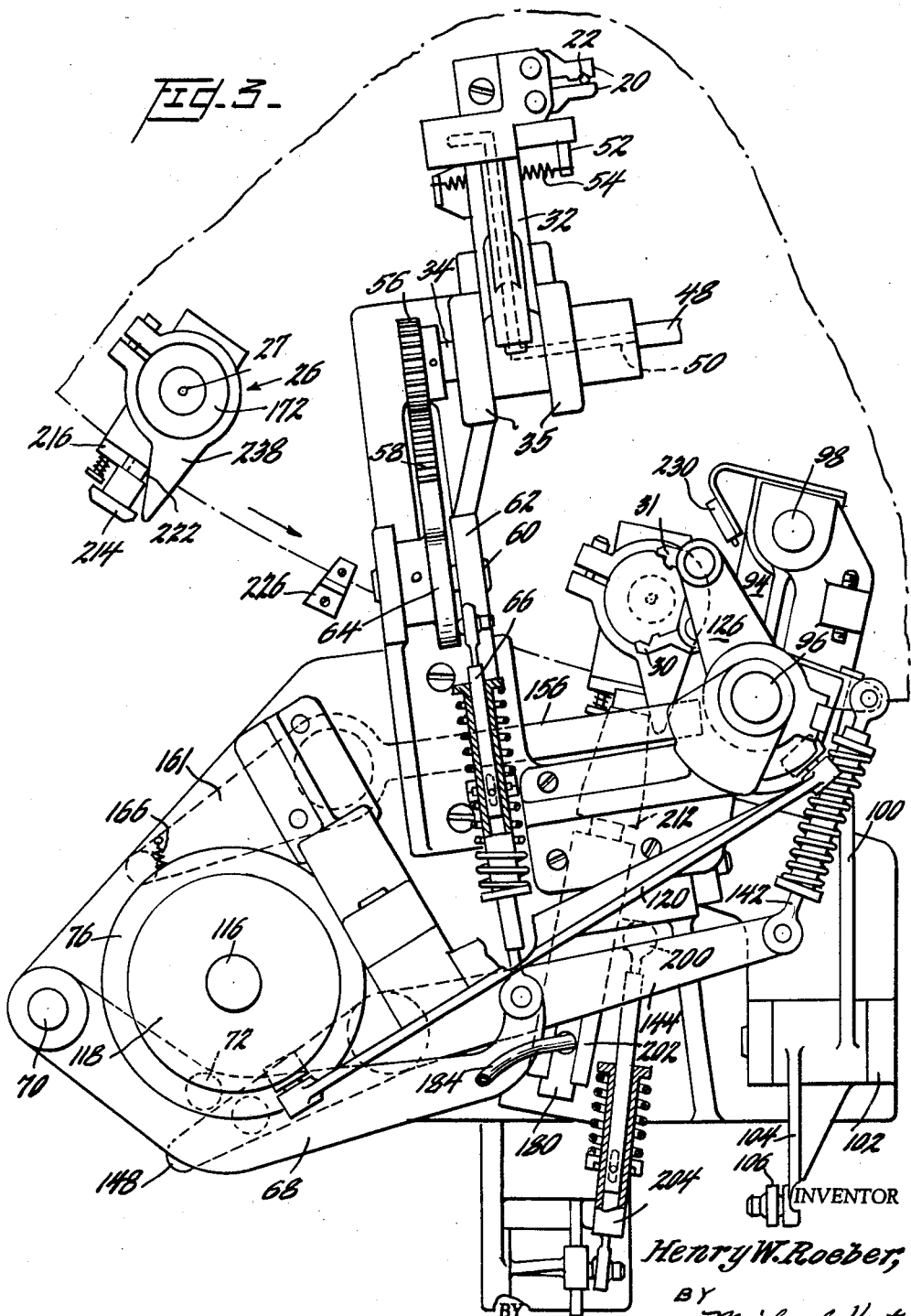

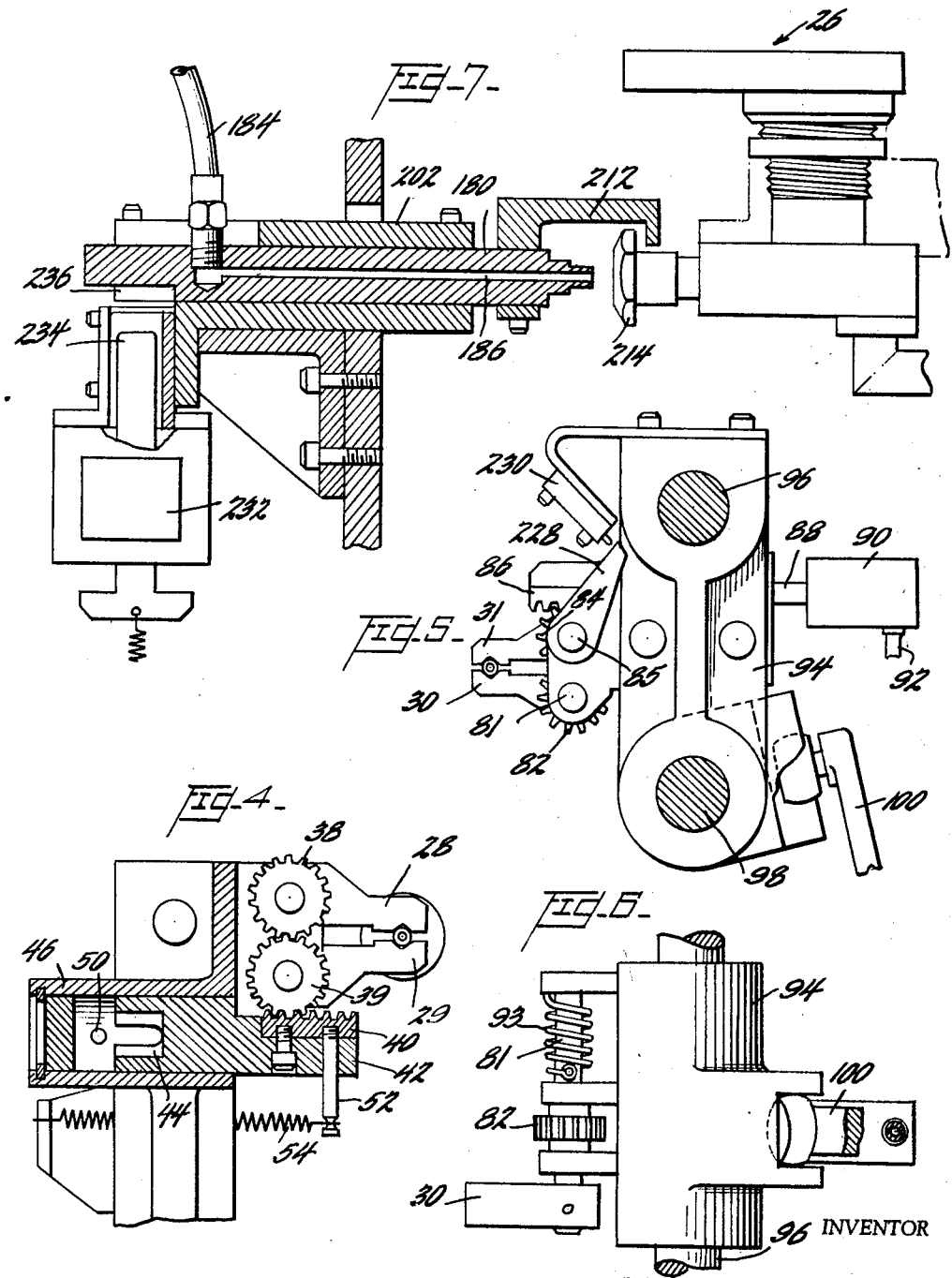

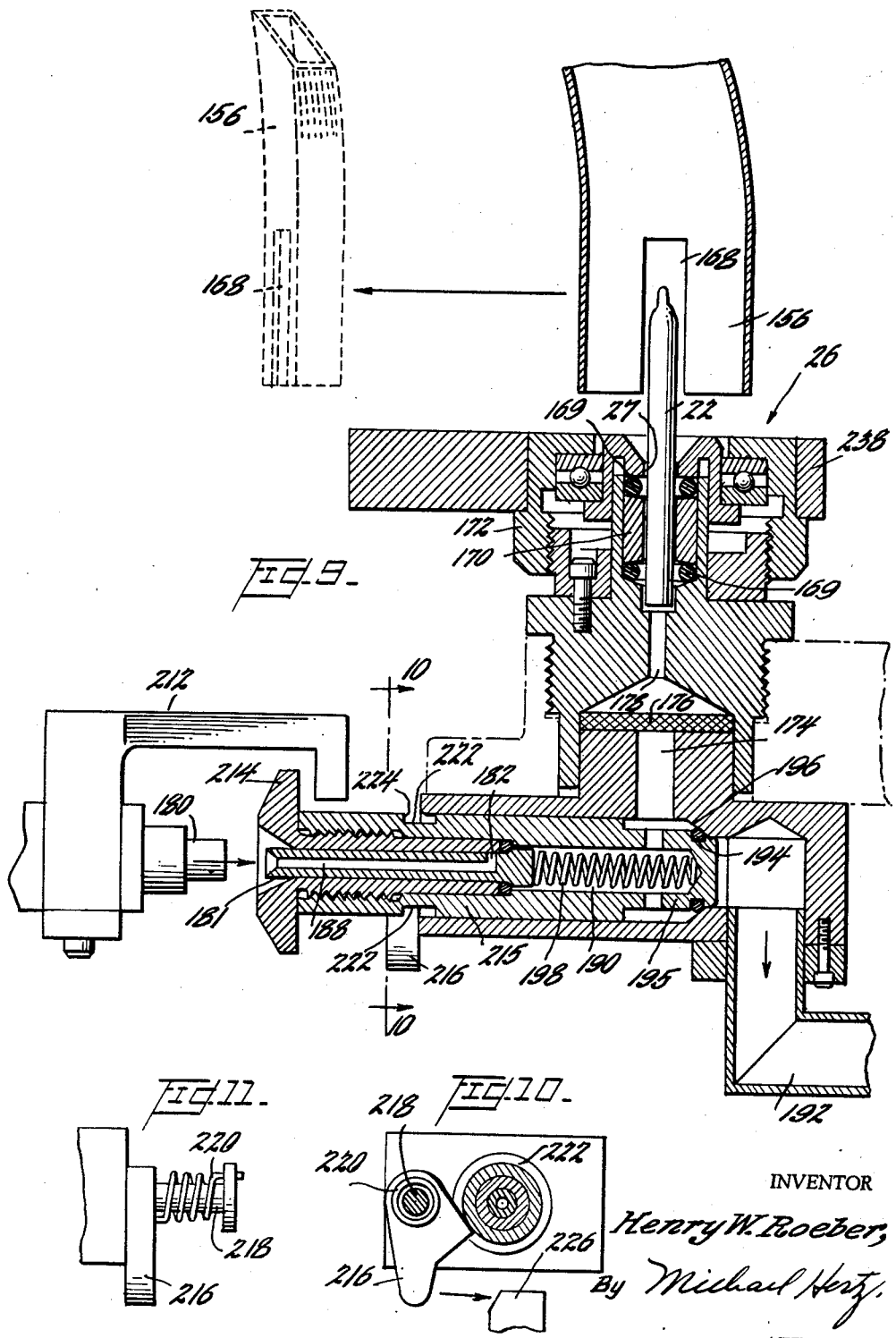

2,915,200
ARTICLE TRANSFER MECHANISM

Henry W. Roeber, Emporium, Pa., assignor, by mesne assignments, to Sylvania Electric Products Inc., Wilmington, Del., a corporation of Delaware Original application August 9, 1956, Serial No. 603,150, now Patent No. 2,868,240, dated January 13, 1959. Divided and this application July 9, 1958, Serial No. 747,488

9 Claims. (Cl. 214—1)

The invention relates to mechanism at a tube transfer station at which a tubulated bulb is transferred from an upper turret portion, on which the bulb is sealed to a stem mount, into a tube exhaust port in a casing on a lower and greater diametered portion of the turret. While held in the port the final processing steps on the tube are performed, as evacuation thereof and sealing off the bulb.

An object of the invention is to provide for a simple mechanism to remove a partially completed electron tube from a support near the peripheral edge of a portion of a turret of small diameter and a high elevation, invert the same and insert a tubulation attached to the inverted tube into a second support near the peripheral edge of the turret where it is of larger diameter and lower in elevation.

A second object of the invention is to provide pusher means to ensure the final downward position of the tube in the second support.

Another object of the invention is to provide for means for positioning a conduit over the second support to receive debris blown therefrom prior to insertion of the tubulation.

Still another object of the invention is to provide means to enable the pusher means to be removed out of the path of the debris conducting means which is positioned over the second support when the turret reaches the tube transfer position and out of the path of the bulb transfer mechanism.

Yet another object of the invention is to provide means for preventing the opening of a suction port in the event a new tubulation is not in preparation for insertion into the second support.

These and other objects will become apparent on consideration of the following description when read in conjunction with the accompanying drawings in which Fig. 1 is a diagrammatic view of the machine showing the course of a partially completed electron bulb as it is being shifted from one turret portion to another.

Fig. 2 is an elevational view of mechanism, partly in section, for effecting the transfer of the tube.

Fig. 3 is a plan view of the transfer mechanism.

Fig. 4 is a view, partly in section, disclosing the mechanism for operating a primary set of tubulation grasping jaws.

Fig. 5 is a plan view of a pair of secondary jaws forming part of the transfer mechanism together with operating mechanism therewith.

Fig. 6 is an elevational view of mechanism for vertically shifting the pair of secondary jaws.

Fig. 7 is a view of fluid control mechanism associated with any second support which may be located at the transfer station.

Fig. 8 is a perspective view of a portion of tube push down mechanism.

Fig. 9 is a sectional view through an exhaust and blow out port with associated control mechanism.

Fig. 10 is a section on the line 10—10 of Fig. 9, and

Fig. 11 is a detail view of a latch associated with vacuum control mechanism.

Referring to the drawings in greater detail, in Fig. 1 there is illustrated the general motion of a tubulated bulb 20—22 from off a sealing pedestal 24 on a turret to a final position, whereat the tubulation 22 of the bulb is inserted in a ported casing 26 on a lower and larger diametered portion of the turret. The type of machine to which the transfer and allied mechanism of the invention is applied is well known in the art and needs no further description. It is known in the art as a double turret sealex, the word sealex being a trade name and not a trade mark. Still referring to the diagram, it will be noted that the bulb is first grasped by a primary set of jaws, 28, 29 which move inward toward each other to grasp the tubulated portion 22 of the bulb at about midway of the length of tubulation and then swing through substantially an arc of 180° to bring the tubulation within the sphere of action of a pair of vertically reciprocatable secondary jaws 30, 31 which move inwardly toward each other to grasp the tubulation at a point between the primary jaws and the bulb 20. Then the primary jaws open and move out of the way of vertical movement of the secondary jaws and the secondary jaws move downward to thrust the tubulation down into a port in the casing 26.

Considering Figs. 2 and 3, the pair of primary jaws is shown as mounted on an arm 32 fixed on a stub shaft 34 rotatively mounted in bearings 35 on the end of bracket 36 fixed to a stationary part of the machine. The pedestal 24 and casing 26 are mounted on the turret fragmentally shown in dotted lines in Figs. 2 and 3. The details of the casing 26 with its port 27 are shown in Fig. 9.

Considering Fig. 4, it will be noted that each of the jaws 28 and 29 is mounted rigid with a pair of intermeshing gears 38 and 39, the gear 39 also meshing with a rack 40 mounted fast on a piston rod 42 integral with a piston with slotted skirt 44 in a cylinder 46 mounted on the arm 32. In Fig. 3, it will be seen that a hose 48 or the like, connects with a duct 50 extending through the pivot of the arm to the cylinder so that fluid pressure may be fed to the cylinder and released therefrom in all positions of the arm. The outlet of the duct at the cylinder is in line with the slot in the skirt to allow for ample displacement of the piston. A pin 52 and retractile spring 54 serve to restore the jaws to open position when fluid pressure is released from the cylinder. The flow of fluid pressure to and from the cylinder is controlled through a valve controlled by a main cam shaft.

The swinging of the arm 32 is effected by a gear 56 fast on the stub shaft 34, said gear meshing with a gear sector 58 fixed to a pin 60 journalled in fixed bearings 62. The sector has a crank arm 64 connected by a telescopic spring link 66, such as is well known in the art, to a bent lever arm 68 pivoted on a vertical shaft 70 mounted in bearings on a fixed part of the machine, the arm being provided with a roller 72 riding in a grooved cam track 74, see Fig. 2, in the underside of a cam 76. The spring link provides for two-way over-travel of the gear sector, but the arm itself is stopped at proper angular positions by resilient bumpers 78 and 80 in cylinders integral with the arm 32 engaging parts integral with the bracket 36.

The cam on the cam shaft controlling the admission of fluid to the cylinder 46 is so contoured that the jaws 28, 29 will close about the tubulation 22 when the turret has completed its indexing movement whereupon the cam 76 will swing the jaws substantially 180° until the tubulation is in the dotted line position of Figs. 1 and 2, over a casing 26. Thereat the jaws will be opened by the release of fluid pressure in the cylinder but only after the secondary jaws 30 and 31 have grasped the tubulation. Referring to Fig. 5, it will be seen that the secondary jaws 30 and 31 are operated in a manner fairly similar to the operation of jaws 28 and 29. The jaw 30 is mounted rigid with a shaft 81 pinned to gear 82, the gear 82 meshing with a gear 84 pinned to a shaft 85 fixed to the second jaw 31 of the pair. The gear 84 meshes with a rack 86 fast on a piston 88 of a cylinder 90 operative to close the jaws, the cylinder being fed with fluid pressure through the intermediary of a conduit 92. Fluid through conduit 92 is controlled by a cam operated valve similar to the control of fluid through conduit 48. A spring 93, Fig. 6, coiled about shaft 81 tends to open the jaws. The jaws 30, 31 and the operating mechanism just described are all mounted on a vertically reciprocatable carriage 94 slidable on posts 96 and 98 fixedly mounted on a stationary part of the machine. To effect vertical reciprocation of the carriage there is provided a crank arm 100, see Fig. 2, pivotally mounted in a bracket 102, on a fixed part of the machine, the arm 100 at one end having a follower sliding in a track 101 in the bracket 94 and its other end being integral with a second arm 104 connected via a link 106 with a bent lever 108. The lever 108 is cam operated and pivoted on a stub shaft 109. The lever is operated by a cam 110 fixed on a cam shaft 112 acting against a cam follower roller 114 on the lever. The cam shaft 112 is driven in synchronism with turret indexing and is gear connected with a vertical cam shaft 116 to which the cam 76 is secured.

Mechanism is provided to ensure that when the tubulation is transferred to the second pair of fluid pressure operated jaws 30 and 31, the upwardly turned base of the tube shall be thrust downwardly through the jaws to ensure the proper height of the bulb above the exhaust port after the tubulation is thrust into the port subsequently to attain proper bombardment of the parts within the tube and proper sealing off of the tubulation. When the turret is indexed so that an exhaust port is in tubulation receiving position, the friction on the tubulation, as it is being inserted, is light while the frictional grip of the jaws 30, 31 on the tubulation is heavier. Therefore, after the tubulation is properly positioned in the jaws by the push down, it remains so properly positioned when inserted in the exhaust port. To provide for the vertical push down action and to provide for timed swinging of the push down mechanism out of the way of the swinging arm 32 as it inverts the tube and brings it to position to be grasped by the second pair of jaws 30, 31, the following mechanism is provided.

Mounted on the shaft 116 at its top is a disc 118 having a face cam 119 of variable height extending from its lower face. Coacting with this face cam is a lever 120 having at one end a follower riding against the cam and at its other end a second follower riding in a trackway 122 on a sleeve 124 slidable and rotatable on post 96. Projecting horizontally from the sleeve 124 is a push down arm 126, carrying at its forward end a vertical push down plunger 128 which may be adjusted in the arm 126 by a suitable set screw 130. The lower face of the push down plunger 128 will engage the tops of the lead-in pins of the tube and force the tubulation to slide downwardly through the jaws 30 and 31 until the bulb has been thrust downwardly to the desired position. To swing the pusher in and out of the path of movement of the swinging arm 32, see Fig. 8, there is mounted on the post 96 a pair of spaced apart upper and lower collars 132 and 134, and a rigid bar 136 is fixedly attached to these collars, the bar snugly and slidably engaging a fork 138 extending from the sleeve 124. As a result when the collar 134 is oscillated, by means soon to be described, the collar 132 will oscillate therewith and by reason of engagement of the bar 136 with the fork 138, so will the sleeve 124 and its hold down arm 126. On the other hand when the sleeve 124 is moved along the post 96, the interfitting bar 136 and fork 138 ensure solely rectilinear motion of the sleeve. The means for oscillating the hold down comprises an extension 140 on the collar 134, a resilient extensible link 142 universally connected to the extension 140 and, see Fig. 2, to a crank arm 144 fixed to a vertical shaft 145 rotatably mounted on a bearing 146 fixed to the machine frame, a second crank arm 148 also fixed to the vertical shaft and having a cam follower 150, and a cam 152 on the vertical cam shaft 116 coacting with the cam follower. A spring 154, stretched between a pin on arm 148 and a fixed part of the frame, is provided to ensure contact of the cam follower 150 with its cam.

Means are also provided at the loading station being described, to remove the tubulation of a previously sealed off tube and other debris remaining in the port. As is well known to those skilled in the art, the type of machine here illustrated has an index position prior to the loading station at which the tubulation is sealed near the juncture with the bulb, and the bulb is removed, but the exhaust tubulation remains in the port. As the turret, see Fig. 3, indexes toward the loading station, the air sealing mechanism about the tubulation is released in well known manner to enable easy removal of the tubulation. In this invention, the tubulation is blown out of the port by mechanism to be described and blown into a conduit shiftable over the port to receive the blown out tubulation and other debris and movable out of the way to permit tubulation and bulb insertion into the port.

The conduit is here shown, see Figs. 2 and 3, as an inverted J-shaped duct 156 pivotally mounted in a bearing 158 in a fixed part of the machine and shiftable over the casing 26 and away therefrom by reason of a collar 160 fixed on the duct having an extension 161 equipped with a cam follower 162. The cam follower rides in a cam 164 fixed to the cam shaft 116. Opposite walls of the duct 156, see Fig. 9, are vertically slotted at its lower end as at 168 to enable the duct to swing over the port and tubulation retained therein after the turret has indexed to the loading position. Within the port there are tubulation clamping rings 169 made of elastic material, such as neoprene, spaced apart by metallic spacer 170. When the duct is swung over the port the rings 169 are not clamped to the tubulation 22 since the nut 172 had been backed off, as is known in the art. Therefore if compressed air were admitted to the port as via filter 176 and duct 178, the tubulation 22 would be blown out of the port and out through the duct 156, to a suitable vessel at the outlet of the duct near the bearing 158. Compressed air may be admitted to the port, see Figs. 7 and 9, by shifting of a slide duct 180 to right, so that the end of the duct engages against the end of the stem 181 of valve 182 and thrusts it to the right. Thereupon compressed air admitted to a hose line or conduit 184 via a cam controlled valve flows through passageway 186 in the slide duct 180, passageway 188 in the valve 182, out past the valve seat into a chamber 190, thence into duct 174 past the filter 176 and out through duct 178. The duct 174 is closed to the exhaust pump connected to the lower right hand end of duct 192 by reason that the suction existing in duct 192 maintains the valve seal 194 of valve 195 closed against the seat 196. A spring 198 reacting between valves 195 and 182 normally tends to maintain the duct 188 cut off from the chamber 190 and any suction that exists therein, as when the valve 195 is displaced from its seat.

The means for moving the slide 180 in toward the valve 182, see Fig. 3, comprises an ear 200 affixed to the slide and extending through a slot in the slideway 202 which supports the slide 180. To the ear is pivoted a resiliently collapsible link 204 whose other end is pivoted to a bell crank 206 pivoted on a fixed part of the machine, the free end of the bell crank being provided with a cam follower 208 engaging a cam 210 fixed on shaft 112. A suitable spring 211 serves to maintain the cam follower 208 against the cam 210. The cam 210 is so contoured that after a short interval of compressed air being applied to the duct 182 to expel the remnant of tubulation 22 remaining in the port after seal-off of the tube, the slide 180 is retracted sufficiently to allow slide valve 182 to function under influence of spring 196 to close off communication between passageway 188 and chamber 190. Then after the duct 156 had been removed and a new bulb attached tubulation had been inserted into the port, the cam 210 further retracts slide 180 to cause a hooked bridge member 212 to engage a button 214 threaded into the valve stem 215 of valve 195 to open the port to suction existing in duct 192. When the port is properly loaded with a tubulation and the button is retracted by the bridge, latching mechanism becomes effective to hold the valve 195 in its open suction position. If not so latched, then during turret indexing, suction will be applied to duct 192 and the valve 195 will be sucked to closed position. The latching mechanism comprises a detent 216 pivotally mounted on a pin 218 at each port and urged by a torsion spring 220 against the peripheral surface of the valve 195 so that when the valve 195 is pulled out by the bridge 212, the detent 216 will be forced into a groove 222 and thus prevent the suction valve from again closing, a shoulder 224 on the valve then engaging a face of the detent. As the turret indexes from unloading station toward the loading station a kickout 226, fixed to a stationary portion of the machine, engages the successive detents to release the same and allow all of the suction valves 195 to close under action of suction in conduit 192, all preparatory to blow out of the remnant tubulation 22.

Means are also provided to prevent opening of the valve 195 in the event no tubulation is grasped by the second pair of jaws 30, 31. Considering Figs. 5 and 7, it will be noted that fast on the shaft 85 of one of the jaws is a control finger 228 operative to close a switch 230 mounted on the slidable carriage 94 when and only when the jaws 30, 31 move beyond the position wherein they grasp a tubulation. In the absence of a tubulation, the jaws move further in toward one another, and the finger 228 then engages and closes switch 230. Closure of the switch energizes the solenoid 232, Fig. 7, pulling up on the core 234 which engages a recess 236 in slide 180, operative to prevent the spring link 204 from pulling back on the slide 180 sufficiently to cause bridge 212 to engage and pull back button 214. Therefore, in the absence of a tubulation 22, the suction valve 195 will not open, thus preventing undue laboring on the suction pump and flooding of the suction ducts 192 with air at high pressures.

The exhaust port in casing 26 has its gasket 169 released and clamped about the tubulation in conventional fashion by rotation of control arm 238 which is firmly clamped about the nut 172.

This application is a division of application 603,150 filed August 9, 1956, now Patent 2,868,240, and wherein is claimed mechanism for clearing out the suction port of any debris which may exist therein.

What is claimed is:

1. An electron tube processing mechanism comprising an indexable turret with circularly arranged pedestals at one elevation of the turret for supporting tubulated electron tubes, tubulation end upward, a series of circularly arranged ports on said turret at a lower elevation and on a larger diametered circle than the circle of the pedestals, said ports being provided to receive the tubulations of the electron tubes, an arm pivotally mounted on a fixed portion of the mechanism and having jaws at its free end to grasp a tubulation of a tube on a pedestal, mechanism to swing the arm to effect inversion of the tube and position it directly over a port, a second pair of jaws movable vertically on a fixed support to grasp the inverted tube, and means for operating all of the jaws to open and close the same and for moving the second pair of jaws downwardly to thrust the tubulation of the inverted tube into a port.

2. An electron tube processing mechanism comprising an indexable turret with circularly arranged pedestals at one elevation of the turret for supporting tubulated electron tubes, tubulation end upward, a series of circularly arranged ports on said turret, at a lower elevation and on a larger diametered circle than the circle of the pedestals, said ports being provided to receive the tubulations of the electron tubes, an arm pivotally mounted on a fixed portion of the mechanism and on a horizontal axis, a gear concentric with said axis fixed to the arm, a gear sector meshing with said gear operative to swing the arm in a vertical plane, said arm swinging first upwardly away from a pedestal and down over a port, said arm having jaws at its free end to grasp a tubulation of a tube on a pedestal and invert the tube as the arm swings, a second pair of jaws movable vertically on a fixed support to grasp the inverted tube, and means for operating all of the jaws to open and close the same and for moving the second pair of jaws downwardly to thrust the tubulation of the inverted tube into a port.

3. An electron tube processing mechanism comprising an indexable turret with circularly arranged pedestals at one elevation of the turret for supporting tubulated electron tubes, tubulation end upward, a series of circularly arranged ports on said turret at a lower elevation and on a larger diametered circle than the circle of the pedestals, said ports being provided to receive the tubulations of the electron tubes, an arm pivotally mounted on a fixed portion of the mechanism and having jaws at its free end to grasp a tubulation of a tube on a pedestal, mechanism to swing the arm to effect inversion of the tube and position it directly over a port, a second pair of jaws movable vertically on a fixed support to grasp the inverted tube, means for thrusting the tube downwardly through the second pair of jaws, means for operating all of the jaws to open and close the jaws, means for operating the thrusting means and mechanism for operating the means for moving the second pair of jaws downwardly.

4. An electron tube processing mechanism comprising an indexable turret with circularly arranged pedestals at one elevation of the turret for supporting tubulated electron tubes, tubulation end upward, a series of circularly arranged ports on said turret at a lower elevation and on a larger diametered circle than the circle of the pedestals, said ports being provided to receive the tubulations of the electron tubes, an arm pivotally mounted on a fixed portion of the mechanism and having jaws at its free end to grasp a tubulation of a tube on a pedestal, mechanism to swing the arm to effect inversion of the tube and position it directly over a port, said mechanism comprising a gear fast with the arm, a gear sector meshing with the gear, a spring link connected to the sector and cam mechanism for operating the spring link, said arm being provided with bumpers for engaging the first portion of the mechanism in both forward and backward movement of the arm, a second pair of jaws movable vertically on a fixed support to grasp the inverted tube, and means for operating all of the jaws to open and close the same and for moving the second pair of jaws downwardly to thrust the tubulation of the inverted tube into a port.

5. An electron tube processing mechanism comprising an indexable turret with circularly arranged pedestals at one elevation of the turret for supporting tubulated electron tubes, tubulation end upward, a series of circularly arranged ports on said turret at a lower elevation and on a larger diametered circle than the circle of the pedestals, said ports being provided to receive the tubulations of the electron tubes, an arm pivotally mounted on a fixed portion of the mechanism and having a pair of jaws at its free end to grasp a tubulation of a tube on a pedestal, a fluid pressure motor for operating said jaws, a duct having a portion coaxial with the arm pivot communicating with a source of fluid under pressure and with the fluid pressure motor, mechanism to swing the arm to effect inversion of the tube and position it directly over a port, a second pair of jaws movable vertically on a fixed support to grasp the inverted tube, valve means synchronized for operation with turret indexing for controlling the motor of the first pair of jaws and means for opening and closing the second pair of jaws and for moving the second pair of jaws downwardly to thrust the tubulation into a port.

6. An electron tube processing mechanism comprising an indexable turret with circularly arranged pedestals at one elevation of the turret for supporting tubulated electron tubes, tubulation end upward, a series of circularly arranged ports on said turret at a lower elevation and on a larger diametered circle than the circle of the pedestals, said ports being provided to receive the tubulations of the electrons tubes, an arm pivotally mounted on a fixed portion of the mechanism and having a pair of jaws at its free end to grasp a tubulation of a tube on a pedestal, mechanism to swing the arm to effect inversion of the tube and position it directly over a port, a second pair of jaws movable vertically on a fixed support to a position above the first pair of jaws and to grasp the tubulation above the first pair of jaws, means for operating all of the jaws to open and close the same, and means for moving the second pair of jaws downwardly to thrust the tubulation of the inverted tube into a port, the first pair of jaws being opened wide enough to allow the second pair of jaws and tube to pass downwardly.

7. An electron tube processing mechanism comprising a conveyor with pedestals at one elevation for supporting tubulated electron tubes, tubulation end upward, a series of ports on said conveyor at a lower elevation, said ports being provided to receive the tubulations of the electron tubes, an arm pivotally mounted on a fixed portion of the mechanism and having a pair of jaws at its free end to grasp a tubulation of a tube on a pedestal, mechanism to swing the arm to effect inversion of the tube and position it directly over a port, a second pairs of jaws movable vertically on a fixed support to a position above the first pair of jaws and to grasp the tubulation above the first pair of jaws, and means for operating all of the jaws to open and close the same, and means for moving the second pair of jaws downwardly to thrust the tubulation of the inverted tube into a port, the first pair of jaws being opened wide enough to allow the second pair of jaws and tube to pass downwardly.

8. An electron tube processing mechanism comprising an indexable turret with circularly arranged pedestals at one elevation of the turret for supporting tubulated electron tubes, tubulation end upward, a series of circularly arranged ports on said turret at a lower elevation and on a larger diametered circle than the circle of the pedestals, said ports being provided to receive the tubulations of the electron tubes, an arm pivotally mounted on a fixed portion of the mechanism and having a pair of jaws at its free end to grasp a tubulation of a tube on a pedestal, mechanism to swing the arm to effect inversion of the tube and position it directly over a port, a second pair of jaws movable vertically on a fixed support to a position above the first pair of jaws to grasp the tubulation above the first pair of jaws, means for operating all of the jaws to open and close the same, means for thrusting the tube downwardly with respect to the second pair of jaws to bring the base of the tube to a given height, and means for moving the second pair of jaws downwardly to thrust the tubulation of the inverted tube into a port, the first pair of jaws being opened wide enough to allow the second pair of jaws and tube to pass downwardly.

9. An electron tube processing mechanism comprising an indexable turret with circularly arranged pedestals at one elevation of the turret for supporting tubulated electron tubes, tubulation end upward, a series of circularly arranged ports on said turret at a lower elevation and on a larger diametered circle than the circle of the pedestals, said ports being provided to receive the tubulations of the electron tubes, an arm pivotally mounted on a fixed portion of the mechanism and having a pair of jaws at its free end to grasp a tubulation of a tube on a pedestal, mechanism to swing the arm to effect inversion of the tube and position it directly over a port, a second pair of jaws movable vertically on a fixed support to a position above the first pair of jaws and to grasp the tubulation above the first pair of jaws, and means for operating all of the jaws to open and close the same, means for thrusting the tube downwardly with respect to the second pair of jaws to bring the base of the inverted tube to a given height, means for swinging said thrusting means into and out of alignment with the second pair of jaws, and means for moving the second pair of jaws downwardly to thrust the tubulation into a port, the first pair of jaws being opened wide enough to allow the second pair of jaws and tube to pass downwardly.

References Cited in the file of this patent

UNITED STATES PATENTS

| | | |
|---|---|---|
| 1,878,156 | Lorenz | Sept. 20, 1932 |
| 2,069,086 | Donovan | Jan. 26, 1937 |
| 2,677,342 | Miller | May 4, 1954 |
| 2,823,815 | Doron | Feb. 18, 1958 |
| 2,832,478 | Malewicz | Apr. 29, 1958 |
| 2,836,313 | Yeo | May 27, 1958 |